United States Patent [19]

Asahi et al.

[11] Patent Number: 4,680,349
[45] Date of Patent: Jul. 14, 1987

[54] METHOD OF POLYMERIZING VINYL MONOMERS WITH COATED REACTOR

[75] Inventors: Tetsuya Asahi; Hiroshi Kaneko; Yasushi Sakai; Akio Kiyohara; Tooru Iwashita, all of Yokkaichi, Japan

[73] Assignee: Toyo Soda Manufacturing Co., Ltd., Shin-Nanyo, Japan

[21] Appl. No.: 815,515

[22] Filed: Jan. 2, 1986

[30] Foreign Application Priority Data

Jan. 14, 1985 [JP] Japan ................................. 60-3329
Feb. 13, 1985 [JP] Japan ................................ 60-24344

[51] Int. Cl.$^4$ ............................................. C08F 2/20
[52] U.S. Cl. .................................. 526/62; 526/344.2
[58] Field of Search ............................... 526/62, 74

[56] References Cited

U.S. PATENT DOCUMENTS 4,080,173 3/1978 Cohen .................................. 427/230
4,267,291 5/1981 Jones ....................................... 526/62
4,320,215 3/1982 Yonezawa ............................. 526/62

FOREIGN PATENT DOCUMENTS 101889 8/1979 Japan .
54-317 4/1980 Japan .
102610 8/1980 Japan .
160004 12/1980 Japan .
7401 2/1983 Japan .
168601 11/1983 Japan .
204006 11/1983 Japan .

*Primary Examiner*—Christopher Henderson
*Attorney, Agent, or Firm*—Oblon, Fisher, Spivak, McClelland & Maier

[57] ABSTRACT

A method of preventing the scale from sticking wherein, upon the polymerization of vinyl type monomers in aqueous medium, reaction products of liquid polybutadiene with phenolic compounds or reaction products between thermoplastic resin gathered from the stumps of pine, phenolic compounds and, if desired, aldehyde compounds are coated beforehand onto the inside face of polymerization vessel, and a preventive agent of scale from sticking are disclosed.

3 Claims, No Drawings

METHOD OF POLYMERIZING VINYL MONOMERS WITH COATED REACTOR

BACKGROUND OF THE INVENTION

The present invention relates to a preventive agent to be used for the prevention of polymer scale occurring on the inside face of polymerization reactor at the time of, for example, polymerization of vinyl type monomers.

When polymerizing vinyl type monomers in the presence of dispersant or emulsifier and polymerization initiator, solid polymer called scale is frequently stuck onto the inside faces of polymerization reactor, that is, inner wall thereof, wings of agitator, baffle plate, condenser, etc.

This scale brings about a lot of disadvantages such as lowering in the heat transfer efficiency, reduction in the product yield, lowering in the quality due to the incorporation of peeled scale into product, labor necessary for the removal of scale and decrease in the productivity accompanying the waste of time necessary for this, occurrence of the problems on the labor safety and hygiene of workers, etc.

In order to dissolve these problems, many methods have been proposed for the prevention of the formation of scale and the sticking thereof onto the polymerization vessel.

For instance, there are methods to coat dyes, pigments and other organic polar compounds, mineral acids and salts thereof, multivalent metallic salts, etc. onto the inside face of polymerization vessel or to add these to aqueous medium, but these methods have various shortcomings that the persistence of the effect is difficult, the characteristics of the product become poor or the like.

As an improved method for these, a method to coat high molecular compounds with functional group possible to prevent the formation of scale on the inside face of polymerization vessel is also proposed.

Phenolic compounds have been used hitherto as the polymerization inhibitors, and many methods utilized these compounds are also proposed.

For instance, methods are disclosed to coat such substances onto the inside face of polymerization vessel as reaction resultant of initial condensate of phenolaldehyde with nitrophenol in Japanese Unexamined Patent Publication No. 160004/1980, self-condensed polyhydric phenol and polyhydric naphthol in U.S. Pat. No. 4,080,173, condensates of phenolic compounds with aromatic aldehydes in Japanese Unexamined Patent Publication No. 54317/1980, ester of propylene glycol with alginic acid in Japanese Unexamined Patent Publication No. 102610/1980, nitrile-containing polymers in Japanese Unexamined Patent Publication No. 101889/1979, modified rosins in Japanese Unexamined Patent Publication No. 7401/1983, resin extracted from pine tree in Japanese Unexamined Patent Publication No. 168601/1983, reaction products between drying oil or semidrying oil, phenolic compounds and, if necessary, aldehydes in Japanese Unexamined Patent Publication No. 204006/1983, and so on.

However, with these methods, there are many points to be improved, for instance, that the polymerization velocity decreases, that the problems are caused in the persistence of descaling effect because of the insufficiency of durability in the coated film, etc.

As a result of diligent studies to dissolve these shortcomings, the inventors have found that, when certain sorts of organic polymers are coated onto the inside face of polymerization vessel and the polymerization is conducted, they prevent the scale remarkably from sticking at the time of the polymerization of, in particular, vinyl type monomers and they are extremely excellent in the adherence to metal, leading to the completion of the invention.

SUMMARY OF THE INVENTION

The invention relates to a polymerization method characterized in that, upon the polymerization of vinyl type monomers in aqueous medium, the sticking of scale onto the inside face of polymerization instrument is prevented through coating of reaction products of phenolic compounds with liquid polybutadiene, thermoplastic resin gathered from the stumps of pine, or said thermoplastic resin and aldehyde compounds beforehand onto the inside face of polymerization vessel.

DETAILED DESCRIPTION OF THE INVENTION

The reaction products of phenolic compounds with liquid polybutadiene to be used in the invention are manufactured through the alkylation reaction of phenolic compounds with liquid polybutadiene for 5 minutes to 10 hours, preferably 1 to 5 hours, at 50° to 250° C., preferably 100° to 180° C., under the atmosphere of nitrogen using acid catalyst.

Further, as the synthetic methods of reaction products of phenolic compounds with thermoplastic resin gathered from the stumps of pine, or said thermoplastic resin and aldehyde compounds, (1) a method wherein the resin gathered from the stumps of pine, phenolic compounds and, if desired, aldehyde compounds are allowed to react simultaneously, (2) a method wherein, after the reaction of the resin gathered from the stumps of pine with phenolic compounds, aldehyde compounds are allowed to react with this, if desired, and (3) a method wherein, after the reaction of phenolic compounds with aldehyde compounds, the resin gathered from the stumps of pine is allowed to react are typical.

With the method (1) aforementioned, the reaction is carried out according to the ordinary manufacturing method of phenol resin, except that the resin gathered from the stumps of pine is allowed to coexist.

Moreover, in case of the method (2), modified phenolic compounds are manufactured first by allowing the resin gathered from the stumps of pine to react with phenolic compounds for 5 minutes to 10 hours, preferably 1 to 5 hours, at 50° to 250° C., preferably 100° to 180° C. under the atmosphere of nitrogen using acid catalyst. Then, if necessary, aldehydes are mixed with modified phenolic compounds aforementioned and thereafter the condensation reaction is conducted to synthesize in the state of the presence of acid catalyst leaving as it is.

Further, in case of the method (3), phenolic compounds are allowed to react with aldehyde compounds beforehand according to the ordinary method and thereafter the resin gathered from the stumps of pine is added and the mixture is heated to obtain modified phenolic resins. At this time, reaction temperature of 50° to 140° C. and reaction time of 1 to 5 hours are used preferably.

Liquid polybutadienes used in the invention are those which are liquid or semisolid at normal temperature and which have molecular weight of 200 to 100,000, preferably 300 to 10,000. These liquid polybutadienes can be obtained by the publicly known methods such as living anionic polymerization (M. Szwarc, Nature, 178, 1168 (1956); M. Szwarc, "Carbanion, Living Polymer and Electron Transfer Processes," Interscience Publisher Inc., New York, N.Y.), coordination anionic polymerization (Japanese Patent Publication No. 20495/1971, Japanese Unexamined Patent Publication No. 43084/1973), etc.

For liquid polybutadienes, there are two types: one consists of 1,2 bond and the other 1,4 bond. Both types can be used in the invention, but liquid polybutadiene consisting of 1,2 bond is more preferable. Furthermore, those having hydroxyl group or carboxyl group for the end group of these liquid polybutadienes and those modified partially with acid anhydrides and with oxygen can also be used.

Moreover, the thermoplastic resin gathered from the stumps of pine to be used in the invention is dark brown solid with a softening point of less than 100° C., which is manufactured from the residue extracted so-called wood rosin, wood turpentine oil and pine oil through ordinary extraction process. This can also be got as a commercial article.

Further, the phenolic compounds constituting the invention are aromatic compounds having not less than one phenolic-OH group. For example, monohydric phenols such as phenol, cresol, etc., dihydric phenols such as resorcin, catechol, hydroquinone, bisphenol A, etc., trihydric phenols such as pyrogallol, hydroxyhydroquinone, etc., or compounds introduced the substituents such as alkyl group, carboxylic acid group, etc. to the compounds described above can be exemplified.

As the acid catalysts used for the reaction above, halides such as aluminum chloride, boron fluoride, zinc chloride, iron chloride, etc., which are used ordinarily, complex compounds thereof, inorganic acids such as hydrochloric acid, sulfuric acid, etc., or organic acids such as paratoluenesulfonic acid etc. can be used.

Also, as to the aldehyde compounds, those used ordinarily are used preferably and, for example, formaldehyde, paraformaldehyde, acetoaldehyde, etc. can be exemplified.

As the mixing ratio of liquid polybutadiene to phenolic compound at the time of the reaction between liquid polybutadiene and phenolic compound, 0.5 to 5 mol, preferably 0.8 to 2 mol of phenolic compound are used for 1 mol of unsaturated group of liquid polybutadiene. Liquid polybutadiene and phenolic compound can also be allowed to react after dissolved into inert solvent. Moreover, the Friedelcraft type catalyst is used in amounts of 0.01 to 10 parts, preferably 0.1 to 2 parts for 100 parts of the mixture of liquid polybutadiene and phenolic compound.

Furthermore, as the ratio of the resin gathered from the stumps of pine to phenolic compound to be employed for the manufacture of phenolic high molecular compounds obtainable from the resin gathered from the stumps of pine and phenolic compounds, 5 to 500 parts, preferably 10 to 300 parts of the resin gathered from the stumps of pine are applied ordinarily for 100 parts of phenolic compound. Moreover, as the ratio of phenolic compound to aldehyde compound, 0.1 to 1.5 mol, preferably 0.5 to 1.1 mol of aldehyde compound are used for 1 mol of phenolic compound.

If the ratios are out of these ranges on use, the effect for the prevention of scale from sticking decreases remarkably.

The descaling agent thus obtained through the reaction is used after dissolved into hydrocarbon-based polar solvent or alkaline solution.

This solution is used by allowing to adhere at a rate of 0.01 to 10 g/m$^2$ (as the polymer) per 1 square meter of the surface of polymerization vessel aimed by the methods such as spray method, rinse method, etc.

For the polymerisation of vinyl type monomers after the application of the invention, suspension polymerization and emulsification polymerization are adopted. The dispersant, emulsifier, initiator, etc. used for this polymerization are not confined particularly and those used widely can be used.

For example, as the dispersants and the emulsifiers, compounds with the property of protective colloid such as partially saponified polyvinyl acetate, copolymers of acrylic acid, cellulose derivatives, gelatin, starch, etc., anionic surfactants such as esters of higher fatty acids with polyhydric alcohols, polyoxyethylene derivatives, etc. anionic surfactants such as metallic salts of higher fatty acids, metallic salts of alkylbenzenesulfonic acids, or the like are used.

As the polymerization initiators, organic peroxides such as benzoyl peroxide, lauroyl peroxide, dioctyl-peroxydicarbonate, etc., azo compounds such as azobisisodimethylvaleronitrile etc. and persulfates such as potassium persulfate, ammonium persulfate, etc. are used.

The vinyl type monomers called so here mean such monomers as have vinyl group and, for example, olefins such as ethylene, propylene, etc., halogenated vinyl compounds such as vinyl chloride, vinylidene chloride, etc., vinyl esters such as vinyl acetate etc., vinyl ethers such as ethyl vinyl ether etc., acrylic esters such as methyl methacrylate etc., metallic salts or esters of maleic acid, fumaric acid, etc., aromatic vinyl compounds such as styrene etc., diene type monomers such as butadiene, chloroprene, isoprene, etc., acrylonitrile and others can be mentioned. The invention can be used for the polymerization of independent vinyl type monomers aforementioned or of the mixture of not less than two sorts of vinyl type monomers, but exerts remarkable effect particularly on the polymerization of monomer mainly composed of vinyl chloride.

In following, the invention will be illustrated concretely based on the examples, but the scope of the invention is not confined to these examples.

SYNTHESIS EXAMPLE 1

Using respective components of (A) and (B) shown in Table 1, the reaction products of liquid polybutadienes with phenolic compounds were synthesized by the method below.

In a four-neck flask fitted with agitator, thermometer and reflux condenser were charged 100 parts of (A) liquid polybutadiene, 200 parts of (B) phenolic compound and 2 parts of anhydrous aluminum chloride, and the reaction was conducted for 3 hours at 150° C. under the atmosphere of nitrogen. After the completion of reaction, the reaction product was cooled to 90° C. and washed with 400 parts of purified water. Following the washing, dewatering and drying were carried out to obtain dark brown reaction product soluble into methanol, acetone and alkali.

SYNTHESIS EXAMPLE 2

In a for-neck flask fitted with agitator, thermometer and reflux condenser similarly to Synthesis example 1 were charged 100 parts of the resin with a softening point of 60° C. gathered from the stumps of pine, 100 parts of pyrogallol and 1 part of p-toluenesulfonic acid, and the reaction was conducted for 4 hours at a reaction temperature of 150° C. under the atmosphere of nitrogen. After the completion of reaction, the reaction product was cooled to lower than 100° C. and then 600 parts of water were added. After washing, dewatering and drying, the reaction product was obtained.

SYNTHESIS EXAMPLE 3

As in Synthesis example 1, in a four-neck flask fitted with agitator, thermometer and reflux condenser were charged 100 parts of pyrogallol, 50 parts of the resin gathered from the stumps of pine, which was used in synthesis example 2, and 1 part of aluminum chloride. After the reaction for 1 hour at 160° C. under the atmosphere of nitrogen, the reaction product was cooled, 75 parts of formaldehyde in 35% concentration were added, and the reaction was conducted for 1 hour under reflux. Then, 600 parts of water were added and, after washing, dewatering and drying, the reaction product was obtained.

SYNTHESIS EXAMPLE 4

As in Synthesis example 1, in a four-neck flask fitted with agitator, thermometer and reflux condenser, 100 parts of pyrogallol, 68 parts of formaldehyde in 35% concentration and 2000 parts of 50% phosphoric acid were allowed to react for 1 hour at 60° C. to obtain reddish violet precipitates.

Reaction was conducted as in Synthesis example 2 using 100 parts of precipitates obtained by dewatering and drying and 50 parts of the resin gathered from the stumps of pine, which was used in Synthesis example 2, to obtain the product.

SYNTHESIS EXAMPLE 5

As in Synthesis example 1, in a four-neck flask fitted with agitator, thermometer and reflux condenser were charged 100 parts of pyrogallol, 75 parts of formaldehyde in 35% concentration, 50 parts of the resin gathered from the stumps of pine, which was used in Synthesis example 2, and 2 parts of oxalic acid dihydrate, and the reaction was conducted for 4 hours under the atmosphere of nitrogen. The reaction temperature was controlled by refluxing water in the system. After the completion of reaction, 400 parts of water were added, and then, washing, dewatering and drying were carried out to obtain the reaction product.

SYNTHESIS EXAMPLE 6

With the exception of use of hydroxyhydroquinone in place of pyrogallol, same method was used as that in Synthesis example 2 to obtain the reaction product.

COMPARATIVE EXAMPLE 1

After charged 250 parts of purified water, 0.25 parts of partially saponified polyvinyl acetate and 0.05 parts of 2,2'-azobis-2,4-dimethylvaleronitrile in a polymerization vessel with an inner volume of 1 m³, 100 parts of vinyl chloride monomer were injected under the state of reduced pressure.

Then, the mixture was agitated, while the temperature was raised to 57° C., and, at the time when the pressure in polymerization vessel decreased by 2 kg/cm² from that at the stationary state of polymerization reaction, the recovery of unreacted monomer was started. The polymerization time at this time was 10 hours.

After the recovery of unreacted monomer, the polymer suspension was taken out from polymerization vessel and the inside face was washed with low pressure water.

Thereafter, the amount of scale stuck onto the inside face of polymerization vessel was measured and 150 g/m² of scale stuck were found.

EXAMPLE 1 THROUGH 4

The reaction products obtained in Synthesis example 1 were converted to 3% acetone solutions, spray coated onto the inside face of stainless polymerization vessels of 1 m³ used in Comparative example 1 and dried for 2 hours at 50° C. to remove acetone, respectively. The coated weight was about 0.4 g/m² each.

Employing these polymerization vessels, polymerization reactions were conducted in the same way as in Comparative example 1. The polymerization time was 10 hours in all cases and the amounts of scale stuck gave the results shown in Table 1, respectively.

TABLE 1

|  | (A) Liquid polybutadiene | (B) Phenolic compound | Amount of scale stuck (g/m²) |
|---|---|---|---|
| Comparative example 1 | No coating |  | 150 |
| Example 1 | 1,2-Polybutadiene (Molecular weight 1050) | Phenol | 5 |
| Example 2 | 1,2-Polybutadiene (Molecular weight 1050) | Resorcin | 2 |
| Example 3 | 1,2-Polybutadiene (Molecular weight 1050) | Pyrogallol | 1 |
| Example 4 | 1,4-Polybutadiene (Molecular weight 1750) | Pyrogallol | 8 |

COMPARATIVE EXAMPLE 2

The resin gathered from the stumps of pine, which was used in Synthesis example 2, was dissolved to make up 3% acetone solution, spray coated onto the inside face of polymerization vessel used in Comparative example 1 and dried. The coated weight was about 0.4 g/m² at this time.

Employing this polymerization vessel, polymerization reaction was conducted by the same method as in Comparative example 1. The polymerization time was 10 hours and the amount of scale stuck was as shown in Table 2.

COMPARATIVE EXAMPLE 3

To 2000 parts of 50% by weight aqueous solution of phosphoric acid was added an aqueous solution containing 126 parts of pyrogallol and 85 parts of formaldehyde in 35% concentration, and the mixture was allowed to react for 1 hour at 60° C. to obtain water-insoluble solids. After washed with water and dried, these solids were converted to 3% acetone solution, spray coated onto the inside face of polymerization vessel used in Comparative example 1 and dried. The coated weight was about 0.4 g/m² at this time.

Employing this polymerization vessel, polymerization reaction was conducted by the same method as in Comparative example 1. The polymerization time was 10 hours and the amount of scale stuck was as shown in Table 2.

EXAMPLE 5 THROUGH 9

The products obtained by the methods in Synthesis example 2 through 6 were converted to 3% acetone solutions, spray coated onto the inside face of polymerization vessels used in Comparative example 1 and dried, respectively. The coated weight at this time was about 0.4 g/m² each.

Employing these polymerization vessels, polymerization reactions were conducted, respectively, by the same method as in Comparative example 1. The polymerization time was 10 hours in all cases and the amounts of scale stuck were as shown in Table 2.

TABLE 2

|  | Amount of scale stuck (g/m²) | Effective number of batches *1 |
| --- | --- | --- |
| Comparative example 1 | No coating 150 | 0 |
| Comparative example 2 | 92 | 1 |
| Comparative example 3 | 17 | 2 |
| Example 5 | 3 | >20 |
| Example 6 | 5 | " |
| Example 7 | 1 | " |
| Example 8 | 1 | " |
| Example 9 | 4 | " |

*1 The terminology of "Effective number of batches" in the above Tables means number of batches which is effectively used until no more procedure of polymerization becomes feasible practically without washing operation due to lost of scale preventive function caused by peeling-off of scale preventive agent coated through the stirring of slurry during the polymerization, or due to undesirable influences on quality such as incorporation of foreign matters, change of hue, etc.

COMPARATIVE EXAMPLE 4

After charged 250 parts of purified water, 5 parts of vinyl acetate, 0.25 parts of partially saponified polyvinyl acetate and 0.05 parts of 2,2'-azobis-2,4-dimethylvaleronitrile in a polymerization vessel with an inner volume of 1 m³, 100 parts of vinyl chloride monomer were injected under the state of reduced pressure. Then, the mixture was agitated, while the temperature was raised to 60° C., and, at the time when the pressure in polymerization vessel decreased by 2 kg/cm² from that at the stationary state of polymerization reaction, the recovery of unreacted monomer was started. The polymerization time at this time was 8.5 hours.

After the recovery of unreacted monomer, the polymer suspension was taken out from polymerization vessel and the inside face was washed with water.

Thereafter, the amount of scale stuck onto the inside face of polymerization vessel was measured and 180 g/m² of scale stuck were found.

EXAMPLE 10 THROUGH 13

As in Example 1 through 4, the reaction products of liquid polybutadienes with phenolic compounds obtained in Synthesis example 1 were coated onto the inside face of polymerization vessels with an inner volume of 1 m³, and then polymerization reactions were conducted by the same method as that in Comparative example 4, respectively. The polymerization time was 8.5 hours in all cases and the amounts of scale stuck gave the results shown in Table 3, respectively.

TABLE 3

|  | (A) Liquid polybutadiene | (B) Phenolic compound | Amount of scale stuck (g/m²) |
| --- | --- | --- | --- |
| Comparative example 4 | No coating | | 180 |
| Example 10 | 1,2-Polybutadiene (Molecular weight 1050) | Phenol | 8 |
| Example 11 | 1,2-Polybutadiene (Molecular weight 1050) | Resorcin | 5 |
| Example 12 | 1,2-Polybutadiene (Molecular weight 1050) | Pyrogallol | 1 |
| Example 13 | 1,4-Polybutadiene (Molecular weight 1750) | Pyrogallol | 20 |

COMPARATIVE EXAMPLE 5

The resin gathered from the stumps of pine, which was used in Synthesis example 2, was converted to 3% acetone solution, spray coated onto the inside face of polymerization vessel used in Comparative example 4, and dried. The coated weight was about 0.4 g/m² at this time.

Employing this polymerization vessel, polymerization reaction was conducted by the same method as that in Comparative example 4. The polymerization time was 8.5 hours and the amount of scale stuck was as shown in Table 4.

COMPARATIVE EXAMPLE 6

The solids obtained by the method in Comparative example 3 were converted to 3% acetone solution, spray coated onto the inside face of the polymerization vessel used in Comparative example 4, and dried. The coated weight was about 0.4 g/m² at this time.

Employing this polymerization vessel, polymerization reaction was conducted by the same method as that in Comparative example 4. The polymerization time was 8.5 hours and the amount of scale stuck was as shown in Table 4.

EXAMPLE 13 THROUGH 18

The products obtained by the methods in Synthesis example 2 through 6 were converted to 3% acetone solutions, spray coated onto the inside face of polymerization vessels used in Comparative example 4, and dried, respectively. The coated weight was about 0.4 g/m² each at this time.

Employing these polymerization vessels, polymerization reactions were conducted by the same method as that in Comparative example 4. The polymerization time was 8.5 hours in all cases and the amounts of scale stuck gave the results shown in Table 4.

TABLE 4

|  | Amount of scale stuck (g/m²) | Effective number of batches *1 |
| --- | --- | --- |
| Comparative example 4 | No coating 180 | 0 |
| Comparative example 5 | 106 | 0 |
| Comparative example 6 | 25 | 2 |
| Example 14 | 6 | >20 |
| Example 15 | 4 | " |
| Example 16 | 5 | " |
| Example 17 | 1 | " |

TABLE 4-continued

|  | Amount of scale stuck (g/m$^2$) | Effective number of batches *1 |
|---|---|---|
| Example 18 | 2 | " |

*1 The terminology of "Effective number of batches" in the above Tables means number of batches which is effectively used until no more procedure of polymerization becomes feasible practically without washing operation due to lost of scale preventive function caused by peeling-off of scale preventive agent coated through the stirring of slurry during the polymerization, or due to undesirable influences on quality such as incorporation of foreign matters, change of hue, etc.

COMPARATIVE EXAMPLE 7

After charged 100 parts of purified water, 100 parts of chloroprene, 4 parts of polyoxystyrene-tallow alkylpropylenediamine, 1 part of acetic acid, 0.5 parts of alumina sol and 0.02 parts of sodium formaldehydesulfoxylate in a polymerization vessel with an inner volume of 1 m$^3$, 0.01 part of t-butyl hydroperoxide was added at 40° C., while the polymerization was completed over 10 hours.

After the completion of polymerization, the amount of scale stuck onto the inside face of polymerization vessel was measured and 80 g/m$^2$ of scale stuck were found.

EXAMPLE 19 THROUGH 22

After the reaction products obtained in Synthesis example 1 were coated onto the inside face of polymerization vessels used in Comparative example 7, respectively, in the same way as in Example 1 through 4, polymerization reactions were conducted by the same method as that in Comparative example 7. The amounts of scale stuck gave the results shown in Table 5.

TABLE 5

|  | (A) Liquid polybutadiene | (B) Phenolic compound | Amount of scale stuck (g/m$^2$) |
|---|---|---|---|
| Comparative example 7 | No coating |  | 80 |
| Example 19 | 1,2-Polybutadiene (Molecular weight 1050) | Phenol | 15 |
| Example 20 | 1,2-Polybutadiene (Molecular weight 1050) | Resorcin | 15 |
| Example 21 | 1,2-Polybutadiene (Molecular weight 1050) | Pyrogallol | 10 |
| Example 22 | 1,4-Polybutadiene (Molecular weight 1750) | Pyrogallol | 20 |

COMPARATIVE EXAMPLE 8

The resin gathered from the stumps of pine, which was used in Synthesis example 2, was converted to 3% acetone solution, spray coated onto the inside face of polymerization vessel used in Comparative example 7, and dried. The coated weight was about 0.4 g/m$^2$ at this time.

Employing this polymerization vessel, polymerization reaction was conducted by the same method as that in Comparative example 7. The amount of scale stuck was as shown in Table 6.

COMPARATIVE EXAMPLE 9

The solids obtained by the method in Comparative example 3 were converted to 3% acetone solution, spray coated onto the inside face of polymerization vessel used in Comparative example 7, and dried. The coated weight was about 0.4 g/m$^2$ at this time.

Employing this polymerization vessel, polymerization reaction was conducted by the same method as that in Comparative example 7. The amount of scale stuck was as shown in Table 6.

EXAMPLE 23 THROUGH 27

The products obtained by the methods of Synthesis example 2 through 6 were converted to 3% acetone solutions, spray coated onto the inside face of polymerization vessels used in Comparative example 7, and dried, respectively. The coated weight was about 0.4 g/m$^2$ each at this time.

Employing these polymerization vessels, polymerization reactions were conducted by the same method as that in Comparative example 7. The amounts of scale stuck were as shown in Table 6, respectively.

TABLE 6

|  |  | Amount of scale Stuck (g/m$^2$) | Effective number of batches *1 |
|---|---|---|---|
| Comparative example 7 | No coating | 80 | 0 |
| Comparative example 8 |  | 43 | 1 |
| Comparative example 9 |  | 15 | 2 |
| Example 23 |  | 2 | >20 |
| Example 24 |  | 5 | " |
| Example 25 |  | 3 | " |
| Example 26 |  | 1 | " |
| Example 27 |  | 1 | " |

EXAMPLE 28

In Example 3, after washed the polymerization vessel having finished the polymerization with water, polymerization same as that in said example was conducted leaving the state as it was.

Conducting the polymerization tests repeatedly by this method, the amounts of scale truck were measured.

As a result, the amount of scale stuck after repeated the polymerizations of 30 batches was almost same as that at the time of first polymerization and remained about 1 g/m$^2$. Whereas, when polymerization tests were repeated in the polymerization vessel without the coating of descaling agent of the invention, the amount of scale stuck was 150 g/m$^2$ at the time of first polymerization as shown in Comparative example 1, and the removal of scale was necessitated in order to repeat subsequent polymerizations.

As described, in all cases of examples, the improvement in the effective number of batches was achieved due to the remarkable decrease in the amount of scale stuck and the betterment in the durability of coated film compared with comparative examples.

What is claimed is:

1. A method of polymerizing vinyl type monomers characterized in that, upon the polymerization of vinyl type monomers in aqueous medium, reaction products of phenolic compounds with liquid polybutadiene or are coated beforehand onto the inside face of polymerization reactor to conduct the polymerization of vinyl type monomers aforementioned.

2. The method according to claim 1, wherein the phenolic compound is pyrogallol or hydroxyhydroquinone.

3. The method according to claim 1, wherein the liquid polybutadiene is 1,2-polybutadiene.

* * * * *